(12) United States Patent
Liet

(10) Patent No.: US 11,691,684 B2
(45) Date of Patent: Jul. 4, 2023

(54) AGRICULTURAL TRANSPORT VEHICLE WITH WEIGHING SYSTEM

(71) Applicant: Trioliet B.V., Oldenzaal (NL)

(72) Inventor: Robert Jan Liet, Oldenzaal (NL)

(73) Assignee: TRIOLIET B.V., Oldenzaal (NL)

( * ) Notice: Subject to any disclaimer, the term of this patent is extended or adjusted under 35 U.S.C. 154(b) by 812 days.

(21) Appl. No.: 16/596,868

(22) Filed: Oct. 9, 2019

(65) Prior Publication Data
US 2020/0114997 A1    Apr. 16, 2020

(30) Foreign Application Priority Data

Oct. 10, 2018    (DE) .................... 20 2018 105 801.0

(51) Int. Cl.
| | | |
|---|---|---|
| B62D 63/08 | (2006.01) | |
| B62D 63/06 | (2006.01) | |
| B62D 21/18 | (2006.01) | |

(52) U.S. Cl.
CPC ........... B62D 63/08 (2013.01); B62D 63/068 (2013.01); *B62D 21/186* (2013.01)

(58) Field of Classification Search
CPC .... B62D 63/08; B62D 63/068; B62D 21/186; A01B 76/00; A01K 5/001; G01G 19/021; G01G 19/02

See application file for complete search history.

(56) References Cited

U.S. PATENT DOCUMENTS

| | | | | |
|---|---|---|---|---|
| 5,295,074 A | * | 3/1994 | Williams | B60G 17/015 701/37 |
| 6,000,702 A | * | 12/1999 | Streiter | B60G 17/016 280/5.514 |
| 6,313,414 B1 | * | 11/2001 | Campbell | A01D 41/1271 73/1.13 |
| 6,898,501 B2 | * | 5/2005 | Schubert | B60G 17/0195 381/71.4 |
| 7,507,917 B2 | * | 3/2009 | Kaltenheuser | A01D 41/12 177/136 |
| 7,790,991 B2 | * | 9/2010 | Verhaeghe | A01F 15/0825 177/136 |

(Continued)

FOREIGN PATENT DOCUMENTS

| | | | | |
|---|---|---|---|---|
| CN | 107314803 | | 11/2017 | |
| GB | 2585895 A | * | 1/2021 | B60G 17/00 |

OTHER PUBLICATIONS

EPO Communication including Search Report dated Feb. 12, 2020 in corresponding European application 19200497.6, 8 pages.

*Primary Examiner* — Paul N Dickson
*Assistant Examiner* — Timothy Wilhelm
(74) *Attorney, Agent, or Firm* — Fattibene and Fattibene, LLC; Paul A. Fattibene

(57) ABSTRACT

Agricultural transport vehicle, in particular mixer-wagon, having at least one hold for agricultural bulk goods and at least one weighing device, in particular a load cell and/or a weighing bar, for detecting the weight of load in the hold; having at least one inertial measuring unit for measuring an acceleration and/or orientation of the agricultural transport vehicle, in particular the hold; and having at least one computing unit which is designed to compensate a raw signal of the weighing device with respect to the measured acceleration and/or orientation.

15 Claims, 10 Drawing Sheets

(56) References Cited

U.S. PATENT DOCUMENTS

| | | | | |
|---|---|---|---|---|
| 7,816,613 | B2* | 10/2010 | Kallonen | G01G 19/12 |
| | | | | 177/136 |
| 8,146,624 | B2* | 4/2012 | Ghiraldi | A01K 5/02 |
| | | | | 356/326 |
| 8,275,516 | B2* | 9/2012 | Murphy | B60W 50/14 |
| | | | | 701/124 |
| 8,651,730 | B2* | 2/2014 | Barbi | A23N 17/007 |
| | | | | 119/51.01 |
| 9,121,747 | B2* | 9/2015 | Mian | G01G 19/035 |
| 9,144,195 | B2* | 9/2015 | Koch | G01F 25/14 |
| 9,199,825 | B2* | 12/2015 | Dueckman | B66C 13/40 |
| 9,297,690 | B2* | 3/2016 | Havimaki | G01G 19/083 |
| 9,417,116 | B2* | 8/2016 | Bishop | G01G 23/002 |
| 9,417,118 | B2* | 8/2016 | Gottfriedsen | G01G 23/10 |
| 9,668,411 | B1* | 6/2017 | Koch | A01D 41/1272 |
| 9,983,048 | B1* | 5/2018 | Meier | G01G 23/18 |
| 10,390,484 | B2* | 8/2019 | Baert | G01F 1/78 |
| 10,506,761 | B2* | 12/2019 | Noonan | B60C 23/04 |
| 10,512,212 | B2* | 12/2019 | Koch | G01J 5/12 |
| 10,520,351 | B2* | 12/2019 | Johansen | G01G 23/005 |
| 10,677,637 | B1* | 6/2020 | Von Muenster | A01D 41/1272 |
| 10,758,878 | B2* | 9/2020 | Patz | G05B 15/02 |
| 10,760,946 | B2* | 9/2020 | Meier | G01G 19/086 |
| 10,875,589 | B2* | 12/2020 | Letscher | A01B 63/145 |
| 10,999,971 | B2* | 5/2021 | Meier | G07C 3/08 |
| 11,185,003 | B2* | 11/2021 | Mei | B60T 8/18 |
| 11,326,973 | B2* | 5/2022 | Smith | G01M 1/122 |
| 2009/0139119 | A1 | 6/2009 | Janardhan et al. | 37/413 |
| 2016/0029559 | A1* | 2/2016 | Inoue | A01D 41/1208 |
| | | | | 56/10.2 J |
| 2017/0370765 | A1* | 12/2017 | Meier | G01G 19/086 |
| 2021/0080958 | A1* | 3/2021 | Biesenbeek | A01C 21/00 |
| 2021/0291931 | A1* | 9/2021 | Kawasaki | B62K 25/283 |

\* cited by examiner

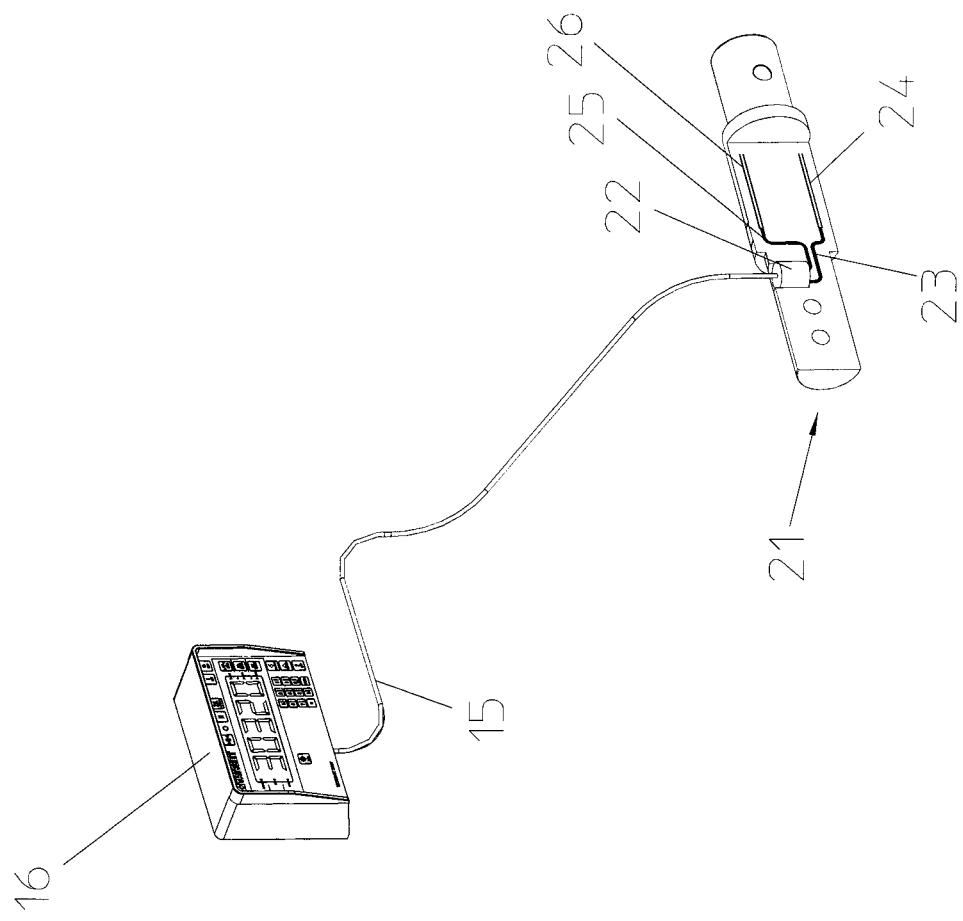

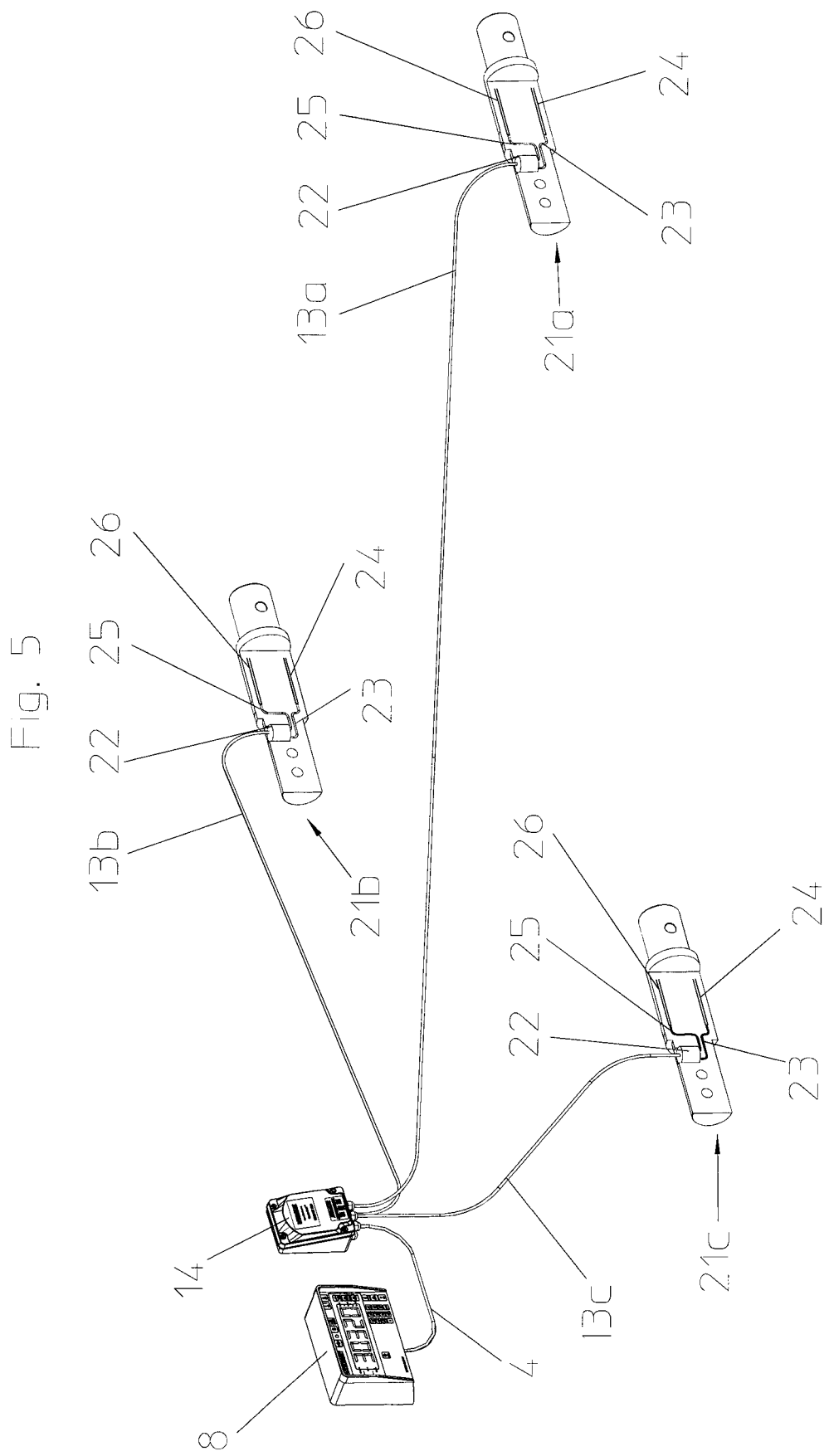

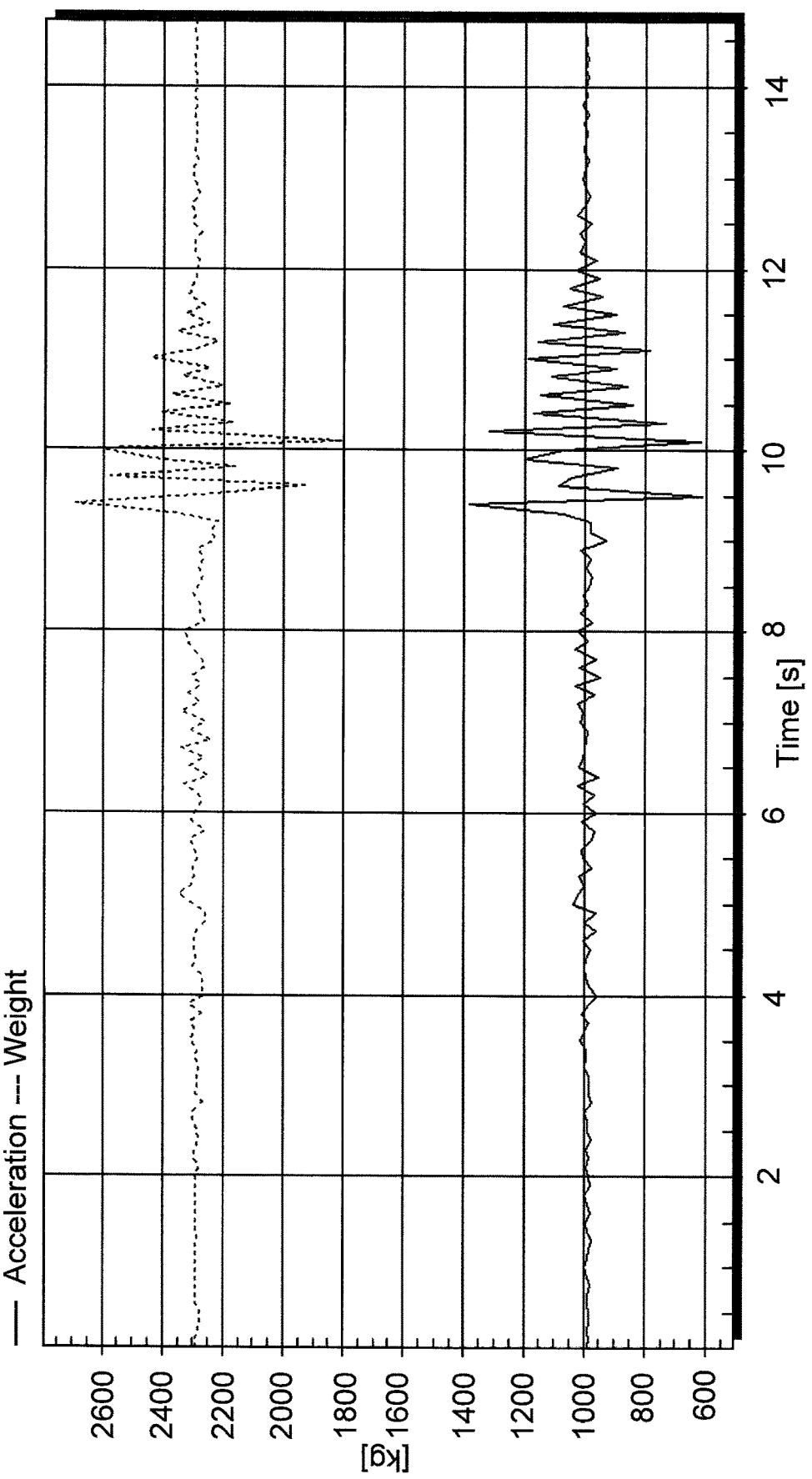

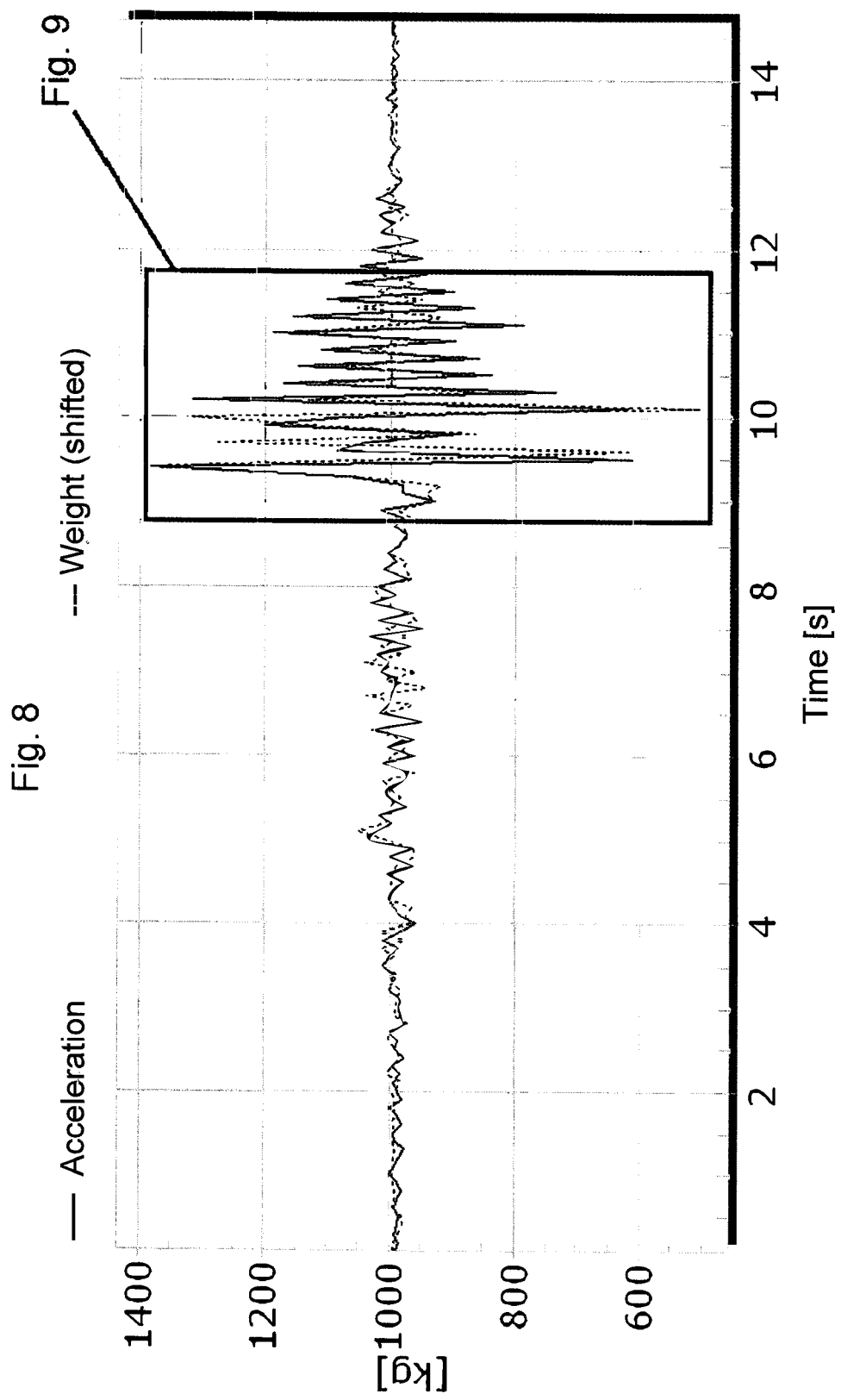

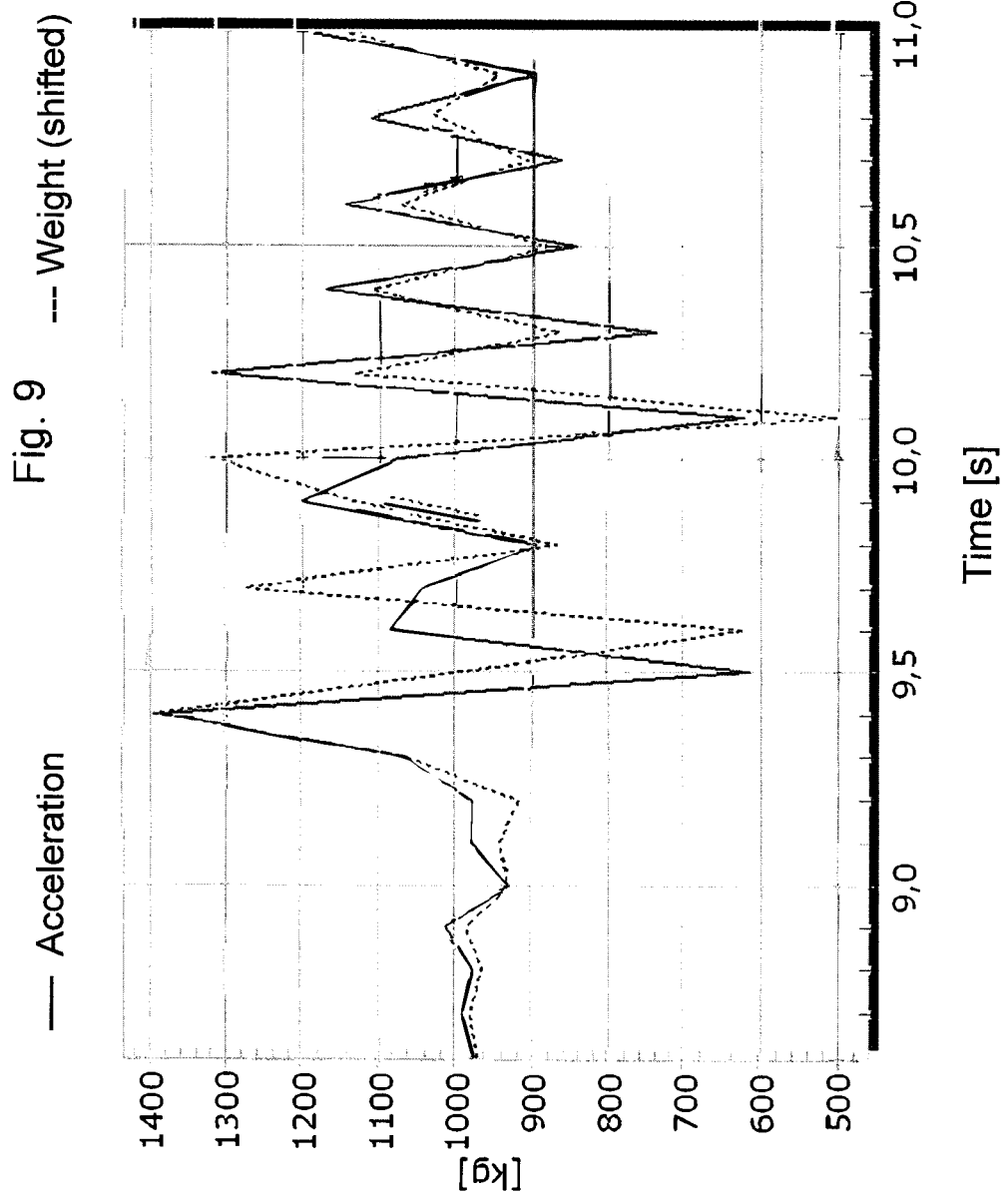

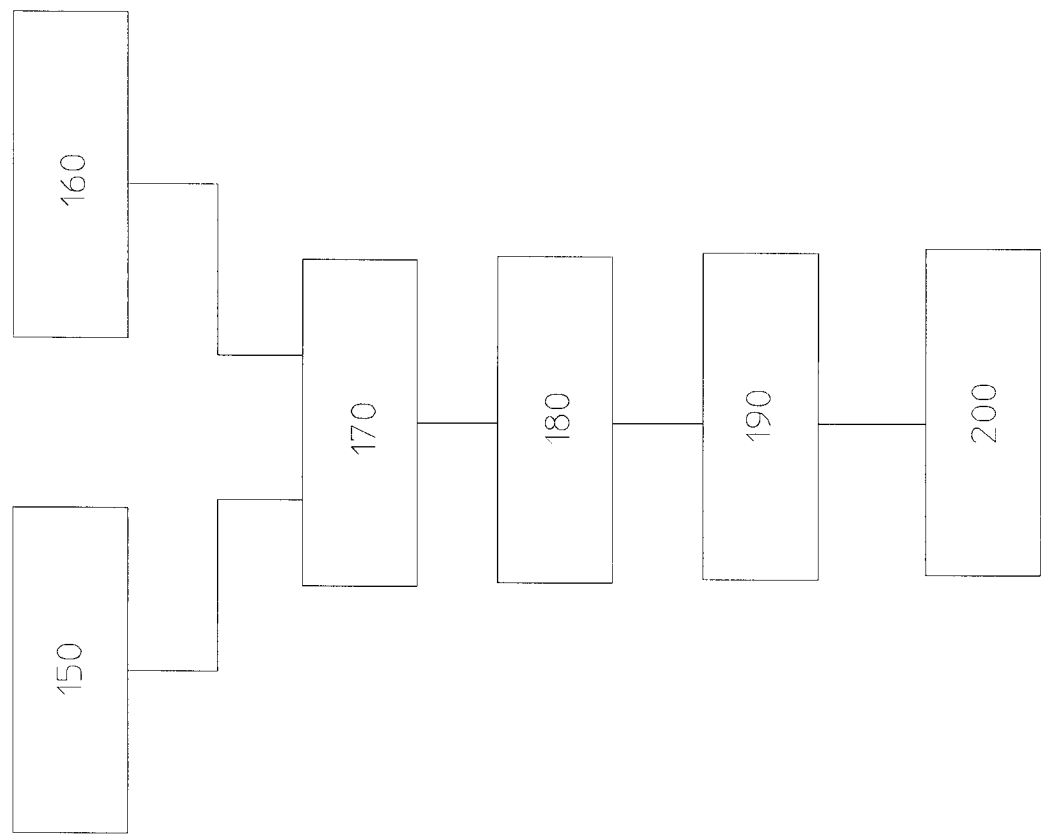

AGRICULTURAL TRANSPORT VEHICLE WITH WEIGHING SYSTEM

FIELD OF INVENTION

The present invention refers to an agricultural transport vehicle with a weighing device for detecting the weight of a load in a hold and a weighing system for use in such an agricultural transport vehicle.

STATE OF THE ART

Transport vehicles are used in agriculture in a variety of ways, for example to transport bulk goods such as fodder, harvested crops or the like. Both self-propelled and guided, i.e. towed or pushed, transport vehicles are used. In many areas it is desirable to weigh the load already in the hold of the transport vehicle. This is particularly necessary during a loading operation with the load and during a high-precision unloading operation, such as the spreading of load on agricultural land or on livestock.

In the past, the capacity of mixer-wagons, in which fodder is composed of and provided from several components, has increased due to increasing livestock. Nevertheless, it is necessary that the weighing systems used with newer mixer-wagons weigh the transported feed mix as accurately as possible.

On the one hand, this is necessary when loading the hold with the individual components of the feed mix in order to achieve the most accurate possible composition of the feed mix. In general, depending on the livestock to be fed, a certain recipe must be produced from roughage, such as grass or hay or maize or another low-cost nutrient, and expensive concentrated feed and/or other by-products, such as spent grains, beet pulp or the like, for the optimum feed mix in a mixing container, in particular a hold of the transport vehicle. For example, feed of slightly lower quality is sufficient for dry dairy cattle or young animals, while a high feed quality is required for highly productive dairy cattle.

Conversely, this must also be taken into account when dosing feed according to a pre-programmed cycle from the hold, e.g. via corresponding discharge openings in the hold, in particular in the form of an upwardly adjustable closure slide. On modern farms, livestock is supplied by driving past livestock groups arranged according to individual feed requirements, with the desired type and quantity of feed pre-programmed to be distributed from the hold(s) of the agricultural transport vehicle. For this purpose, agricultural transport vehicles, in particular mixer-wagons, generally have weighing systems with a screen showing the remaining and/or already applied weight of the feed mix as the vehicle passes by. In this way, the driver can always see how much feed of a certain feed mix is still to be fed to a certain livestock group. If this display reaches zero or another limit, the programmed feeding process moves to the next livestock group, indicating the amount of feed required for this next livestock group.

Today's mixer-wagons have capacities of 36 to 52 m³ or 30 to 45 t, for example. Due to unevenness of the ground or road surface and oscillations during loading, the transport vehicle accelerates, jumps and vibrates, which falsifies the weight determined by the weighing system. Depending on the weighing system used, the inclination of the ground or the road surface, side winds, torques when starting or braking the transport vehicle, temperature influences, as well as changes in the direction of travel and speed also have a negative effect on the precision of the measurement results of the weighing systems. These influences can easily lead to deviations of 50 to 400 kg in the case of the mixer-wagons mentioned above. As a result, an inaccurate amount of feed is distributed to the respective livestock groups, which has to be corrected laboriously by hand in order to avoid negative developments of the livestock. For example, programmed switching from one livestock group to the next takes place too early or too late. As a result, in today's mixer-wagons it is often necessary to stop after spreading part of the feed mixture to balance the weighing system. However, this is costly and delays the entire process.

It is also necessary to precisely determine the weight of the loaded feed when pre-programmed loading of a mixer-wagon with different feed components takes place. For example, a pre-programmed loading process involves the transfer of feed components from one or more feed silos, with the feed transferred generally falling into the mixing container from above. Alternatively, an independent conveyor such as a loading fork, loading arm or loading shovel can be used to load the mixing container from above. In any case, accelerations and oscillations of the mixing container or transport vehicle also occur here, which falsify the determination of the weight of the loaded fodder. In order to avoid an incorrect composition of the feed mix, it is therefore often necessary to wait for the oscillations of the transport vehicle to decay before changing to the next feed component. These negative influences are also important for stationary mixing containers in which the feed mixes are put together. In order to shorten the loading time and avoid incorrect composition of the feed mix, it is therefore desirable to determine the weight of the feed components quickly and with high precision.

DESCRIPTION OF THE INVENTION

The present invention is thus based on the object of providing a weighing system for agricultural transport vehicles that delivers the most precise weighing result possible, independent of falsifying influences such as acceleration, vibration and ground inclination. Agricultural transport vehicles are also to be provided which can precisely and reliably detect the weight of load in a hold. In general, the present invention is based on the object of simplifying and accelerating loading and unloading processes of agricultural transport vehicles.

The above-mentioned objects are solved by an agricultural transport vehicle, in particular a mixer-wagon, having at least one hold for agricultural bulk goods and at least one weighing device, in particular a load cell and/or a weighing bar, for detecting the weight of load material in the hold, wherein at least one inertial measuring unit for measuring an acceleration and/or orientation of the agricultural transport vehicle, in particular the hold, is provided and at least one computing unit which is designed to compensate a raw signal of the weighing device with respect to the measured acceleration and/or orientation is provided. The at least one computing unit can in particular be integrated into the respective inertial measuring unit. At least one of the at least one computing units can be integrated into the respective inertial measuring unit. In this case, at least one additional, separate computing unit can be provided for the inertial measurement units without their own computing unit.

In addition to the mixer-wagons mentioned above, the present invention also comprises any other type of agricultural transport vehicle, such as those with a fixed hold structure which can be loaded from above, from behind and/or from the side and can be unloaded through a rear unloading opening, through one or more floor openings and/or through one or more side-mounted discharge openings. The transport vehicle may be self-propelled or towed or pushed by a powered vehicle such as a tractor. A self-propelled transport vehicle can in particular be designed as an autonomously-propelled vehicle, i.e. without a driver or operator, and thus be a robot. The autonomously moving transport vehicle can carry out loading, mixing and feeding operations automatically. The transport vehicle may have its own loading equipment, such as a shovel or front loader, for loading load. It can be uniaxial or multi-axial. Via the one or more axles and the wheels connected thereto, the transport vehicle can be supported towards the ground by a chassis frame for accommodating at least one hold. Two or more holds may be arranged on the chassis frame.

As mentioned above, at least one hold is designed in particular for agricultural bulk goods, such as fodder, and harvested material, in particular chopped or granular harvested material.

According to the invention, the agricultural transport vehicle has at least one weighing device for detecting the weight of load in the hold(s). In particular, each hold may be assigned its own weighing device. The weighing device can be designed in particular as a load cell or weighing bar. Load cells and weighing bars are generally well known, so that a detailed description is not given here. Load cells are designed to measure a force applied to determine a weight force. In the usual design, load cells determine the acting weight force by deformation, in particular by elongation. A special further development of such load cells is given by the well known weighing bar. Here, the deformation of a massive, rod-shaped body, usually made of metal, is measured by means of one or more strain gauges when the weighing bar is loaded. Weighing bars, for example, can be designed as so-called spring or bending beams. A strain gauge can be mounted on the top and/or bottom of the weighing bar. On so-called shear beams, the strain gauge is located at one point on or as close as possible to the center axis of the weighing bar. Weighing bars must not necessarily be linear, but can also assume other shapes, e.g. s-shaped. We also know of load cells that measure an acting force piezoelectrically, hydraulically and/or pneumatically. In addition, so-called pressure load cells are known in which a block-shaped or cylindrical solid is used as a measuring body. The load cells and weighing bars can be selected according to the requirements regarding the maximum weight to be detected and the arrangement on the transport vehicle, in particular the hold or chassis of the transport vehicle.

The at least one weighing device is arranged on the agricultural transport vehicle in such a way that it covers at least part of the weight of the load in a hold. The weighing device is designed to output the detected weight force in the form of an electrical signal, which is referred to here and in the following as the raw signal of the weighing device. The term raw signal does not preclude the weighing device from carrying out electrical and/or electronic processing on the measurement signal. These can include, for example, amplification, filtering and/or smoothing of the measurement signal. In order to carry out the aforementioned machining processes, the weighing device may have components known per se, such as amplifiers or signal processors. However, according to a special embodiment, the raw signal can be output from the weighing device without filtering or smoothing in particular. However, the raw signal of a weighing device here and in the following always comprises only the measurement signals detected by this weighing device and is therefore limited to the weight force detected by the special weighing device.

The at least one weighing device may be provided at one or more support points of the hold on the chassis and/or one or more axle suspensions. If, for example, axle suspensions are provided on both sides of the transport vehicle, weighing devices may be provided on both sides of the transport vehicle. In addition, a weighing device may be located at the center of gravity of the transport vehicle and/or on a towing device, such as a drawbar, of the transport vehicle. In particular, a sufficient number of weighing devices may be provided and placed in suitable positions so that the weighing devices can be used to detect the total weight of the hold or the load contained therein.

It should be noted that it is generally assumed here that the empty weight of the transport vehicle and relevant parts of it, such as the hold, are known, so that, for the sake of simplicity, we are talking here and in the following about detecting the weight of the hold or load, even if the measured weight force also includes parts of the transport vehicle. If the transport vehicle has several holds, the weighing devices can always be arranged in such a way that the total weight of each hold, including its contents, can be detected separately. For example, each hold may be mounted on the chassis of the transport vehicle by means of one or more load cells or weighing bars, the output signals of the group of weighing devices associated with a given hold being processed separately from the output signals of the other weighing devices.

The at least one weighing device may be designed to output and transmit the measurement signals via cables, for example via a bus, in particular a CAN bus, and/or wirelessly, for example via a communication module, in particular a Bluetooth or Wi-Fi transmitter module. For this purpose, the weighing device may comprise the usual elements known per se, such as a coding device, a transmitter or the like.

According to the invention, the agricultural transport vehicle has at least one inertial measuring unit for measuring an acceleration and/or orientation of the agricultural transport vehicle, in particular of the hold. Inertial measurement units (IMU) are well known in the state of the art, so that for reasons of clarity a detailed description is not given. An inertial measuring unit comprises a spatial combination of several inertial sensors such as acceleration sensors and rotation rate sensors. Up to 6 possible kinematic degrees of freedom can be detected by providing up to 3 accelerometers (translation sensors), each standing orthogonally on top of the other, for the detection of the translatory movement in the X or Y or Z direction and up to 3 rotation rate sensors (gyroscopic sensors), mounted orthogonally to one another, for the detection of rotating (circular) movements, for example about the yaw axis, the longitudinal axis of the vehicle and its transverse axis. An inertial measuring unit is designed to measure both an acceleration and an orientation or rotation rate with respect to at least one degree of freedom. In particular, the inertial measuring unit can be designed to measure acceleration and orientation or rotation rate in all 6 degrees of freedom. While here and in the following it is always referred to detection an orientation, it goes without saying that an equivalent rotation rate can also be detected. The temporal change of the orientation in relation to a rotation axis corresponds to the rotation rate around this rotation axis. In addition to or as an alternative to the gyroscopic sensors, the inertial measuring unit can also include magnetic field sensors (magnetometers) for detecting orientation.

The inertial measuring unit can in particular be designed as a compact component, whereby the translation sensors, gyroscopic sensors and/or magnetic field sensors together with a processor, for example a CPU, are integrated in a single chip. Alternatively, the translation sensors and gyroscopic sensors can be mounted on a printed circuit board, while the CPU and/or magnetic field sensors are mounted separately. The inertial measurement unit may be designed to detect acceleration and/or orientation at a frequency greater than or equal to the measurement frequency of the weighing equipment. Further special developments for at least one inertial measuring unit are listed below in detail.

The agricultural transport vehicle has at least one inertial measuring unit, wherein the at least one inertial measuring unit can be arranged in the region of a center of gravity of the transport vehicle, on one or more axles and/or on a hitch device. In particular, a separate inertial measuring unit may be arranged on each wheel axle of the transport vehicle to measure the accelerations and orientation of that axle. Of course, separate inertial measurement units can be arranged on each side of the transport vehicle to measure the acceleration and orientation of the corresponding side of the respective axle or axle suspension. The choice of locations at which separate inertial measurement units are arranged can follow in particular the support points of the chassis. For example, if the chassis is supported on both sides by the wheel axles, the above-mentioned separate inertial measurement units may be provided on each side of the transport vehicle. An inertial measuring unit located in the area of the center of gravity, especially below the center of gravity, i.e. approximately in the middle between the sides of the vehicle, can, on the other hand, detect the overall acceleration of the transport vehicle as well as its orientation. An inertial measuring unit mounted on a hitch device is particularly suitable for detecting oscillations and accelerations caused by a towing vehicle. If only one inertial measuring unit is provided, it may be advantageously located near the center of gravity, i.e. less than 50 cm away, preferably less than 20 cm away from the center of gravity of the transport vehicle. The inertial measuring unit may be located below the center of gravity in particular.

The at least one inertial measuring unit may be designed to output and transmit the measurement signals via cables, for example via a bus, in particular a CAN bus, and/or wirelessly, for example via a communication module, in particular a Bluetooth or Wi-Fi transmitter module. For this purpose, the inertial measuring unit can have the usual and familiar elements such as a coding device, a transmitter, or the like.

The at least one inertial measuring unit can be arranged in such a way that it measures the acceleration in the direction of the weight force by means of a translation sensor when moving in a horizontal plane. When driving with inclination, the orientation angles measured by the inertial measuring unit in combination with the measured accelerations perpendicular to the acceleration measured by the translation sensor may be used to determine the acceleration in the direction of the weight force. From the complete detection of all 6 degrees of freedom, it is possible to determine an interference signal acting in the direction of the weight force, i.e. the acceleration due to gravity, irrespective of the orientation of the transport vehicle and the forces and torques acting on the transport vehicle.

The acceleration and/or orientation measured by the at least one inertial measuring unit can thus be used to compensate for the falsifying influence of the above-mentioned accelerations, oscillations and inclinations of the transport vehicle on the measured weight. In particular, there is a correlation between oscillations or peaks in the output signal of the at least one weighing device and oscillations or peaks in the interference signal acting in the direction of the weight force, which can be determined from the measurement signals of the at least one inertial measuring unit. This correlation can be used to remove artifacts due to the accelerations, oscillations and inclinations of the transport vehicle described above from the output signals determined by at least one weighing device. According to the invention, this compensation takes place with regard to the measured acceleration and/or orientation on the raw signal of the weighing device. In contrast to filtering or smoothing the output signals of at least one weighing device, compensation for the measured acceleration and/or orientation requires only a small amount of time, especially since the correlation with respect to the inertial measurement units is almost instantaneous, depending on the arrangement of the weighing devices. The weight forces measured by the weighing devices can thus be corrected approximately instantaneously, i.e. compensated. This avoids the aforementioned forced stops of the vehicle.

The compensation of the raw signal(s) of the at least one weighing device with respect to the acceleration and/or orientation measured by the at least one inertial measuring unit is carried out in accordance with the invention in a computing unit of the agricultural transport vehicle, which can in particular be integrated in the at least one inertial measuring unit. Each inertial measuring unit can have its own computing unit. The computing unit can be a processor, such as a CPU or GPU, or a digital signal processor (DSP). The compensation of the raw signal(s) can be done via software and/or hardware. For this purpose, a Field Programmable Gate Array (FPGA) or an application-specific integrated circuit (ASIC) can be provided.

The at least one computing unit may be connected via wireless communication and/or cable to the at least one weighing device and the at least one inertial measuring unit. A wide variety of topologies are conceivable. For example, several weighing devices can transmit raw signals to the computing unit, which are compensated by the acceleration and/or orientation measured by a single inertial measuring unit. Conversely, the raw signal of a specific weighing device can be compensated by accelerations and/or orientations measured by several inertial measuring units, using different processing operations such as center positions. In a special case, each raw signal of a weighing device can be assigned its own inertial measuring unit, whose measured acceleration and/or orientation is used by the computing unit to compensate for the raw signal. This is particularly advantageous if the respective computing unit is integrated into the corresponding inertial measuring unit. Of course, several computing units can also be provided, each processing one or more raw signals. Furthermore, a computing unit integrated in an inertial measuring unit is conceivable, which processes several raw signals of different weighing devices by means of the acceleration and/or orientation measured by this inertial measuring unit.

The computing unit is thus designed to combine one or more raw signals from one or more weighing devices with the output signals from one or more inertial measuring units in order to eliminate or compensate for falsifying influences on the measured weight signals due to acceleration, oscillations and inclination of the transport vehicle. To this end, the computing unit uses processing methods known as information fusion, in which data from different sensors are linked with the aim of obtaining more precise measurement results. Details of the special connection of the data are described in more detail by means of an example in connection with the Figures. For information fusion, the computing unit may comprise a storage medium and/or a writable and in particular non-volatile storage unit for storing instructions as software which determine which of the output signals of the weighing devices and inertial measurement units are processed by the computing unit. In particular, the storage medium can be designed to be rewritable, for example in the form of flash memories, EEPROM, RAM or the like.

As mentioned above, each weighing device can be assigned a separate inertial measuring unit designed to compensate for the raw signal from that weighing device. In this case it is particularly advantageous if the inertial measuring unit is located in the immediate vicinity of the corresponding weighing device, i.e. less than 50 cm away, preferably less than 20 cm away. The direct spatial relationship between the inertial measuring unit and the weighing device ensures that the oscillations, accelerations and inclinations that falsify the raw signal of the weighing device are detected locally by the inertial measuring unit.

In particular, the inertial measuring unit may be integrated into the weighing device. In addition to the direct spatial reference, this simplifies the signal paths and the power supply. In particular, this results in an extremely compact component that can be used flexibly at various points on the transport vehicle. The computing unit described above can also be integrated into the inertial measurement unit for this further development.

The computing unit of the inertial measuring unit can also be configured to compensate the raw signal of the weighing device depending on a position of the weighing device on the agricultural transport vehicle. The configurability can, for example, be realized by means of the above-mentioned storage medium or storage unit. Depending on the position of the weighing device on the agricultural transport vehicle, different parts of the transport vehicle are detected during the weighing process as mentioned above. For example, a weighing device mounted on the axle of a single-axle transport vehicle measures the total weight of the transport vehicle minus the partial weight on a hitch device of the transport vehicle. Via the configurability of the computing unit, portions of the raw signal attributable to the detected empty weight of the respective parts of the transport vehicle can be subtracted from the raw signal or the compensated raw signal.

The agricultural transport vehicle may also include a weighing computer designed to process the compensated raw signals from at least one weighing device into a total weight of the load in the hold. In the simplest case, the weighing computer can add the compensated raw signals to the group of weighing devices assigned to a particular hold. Furthermore, the above-mentioned subtraction of the known empty weight of the hold or other parts of the transport vehicle from the individual or summed compensated raw signals can be performed to determine the total weight of the load. The weighing computer can be designed to determine the total weight of the load in each hold separately. To process the compensated raw signals, the weighing computer is connected to at least one computing unit via cable and/or wireless communication. For this purpose, the weighing computer has the known devices, such as at least one bus, in particular a CAN bus, a transmitter module, in particular for Bluetooth or Wi-Fi communication, or the like.

Furthermore, the weighing computer can have a display, in particular a touch screen display, on which, among other things, the total weight of the load can be displayed. Via the touch screen display and/or another input unit of the weighing computer, the user can make entries, for example to select a feed mix or a feeding program. The weighing computer may be located in a cabin of a self-propelled transport vehicle or in a suitable position on a towed transport vehicle.

The weighing computer as well as the weighing devices and inertial measuring units can be battery powered, with the battery being rechargeable wirelessly, or connected to a power supply of the transport vehicle. The weighing computer may be programmable and may have a storage unit, such as a flash memory. By programming the weighing computer, pre-programmed loading programs and/or unloading programs of the hold can be run, which, for example, are adapted to a specific feed composition or a specific feeding of different livestock groups. Instructions for the operator of the transport vehicle can be shown on the display of the weighing computer.

The weighing computer may also be designed to apply a filter, in particular a smoothing filter or a low-pass filter, to the compensated raw signals. Such a filter can be used to remove high-frequency oscillation signals from the compensated raw signals. However, since the raw signals have already been corrected by the acceleration and/or orientation measured by the at least one inertial measuring unit, the input signals at the weighing computer exhibit considerably smaller fluctuations than the uncompensated raw signals. For this reason, the filter cannot only be used more precisely, but also more efficiently and quickly. Pre-compensation by means of the measured accelerations and/or orientations thus avoids the usual time delay when the weighing computer outputs the specific weight of the load. This can also accelerate the entire loading or unloading process.

The weighing computer may also include a wireless communication module, in particular a Bluetooth module or a Wi-Fi module, for wireless communication with a Software-as-a-Service (SaaS) provider and/or a mobile telecommunications terminal, such as a portable touch screen display operator, laptop, tablet or smartphone. Wireless communication with a SaaS provider allows the weighing computer to connect to the cloud, updating the software stored in the weighing computer's storage unit. In this way, new recipes for feed mixes and improved unloading programs can be automatically downloaded from the cloud to the weighing computer. Via the data connection of the weighing computer to the at least one computing unit, in particular integrated into the at least one inertial measuring unit, the software stored in the storage units of the at least one computing unit can also be updated in order to enable improved processing of the incoming data signals. Alternatively, the computing units or inertial measurement units may have their own wireless communication modules for wireless communication with a SaaS provider, through which the respective software can be updated. In this case, the software can be adapted depending on a changed position of the inertial measuring unit or at least one weighing device.

As mentioned above, the inertial measuring unit, in particular the integrated computing unit, may have a writable, in particular non-volatile, storage unit for storing software. For example, the storage unit may include a flash memory.

The agricultural transport vehicle may in particular be a mixer-wagon, with at least one mixing container provided as hold for fodder as load. In the mixing container the feed mix is put together as known, whereby a corresponding mixing organ, for example a mixing screw, can be provided in order to mix the feed components filled into the mixing container from above with each other. A large number of alternative further developments, for example with a paddle mixer, chains, etc., are state-of-the-art and can be applied to the transport vehicles described here.

As described above, at least one weighing device may be provided in the area of the center of gravity of the mixer-wagon and/or on an axle of the mixer-wagon and/or on a hitch device. Likewise, at least one inertial measuring unit may be provided in the region of the center of gravity of the mixer-wagon and/or on an axle of the mixer-wagon and/or on a hitch device. The arrangement of the weighing devices can be selected in such a way that the total weight of at least one hold can be reliably detected. For example, in a guided mixer-wagon, it is desirable to provide a weighing device on the hitch device in order to measure the proportion of the weight force that is loaded there. Otherwise, the further developments described above apply to the arrangement of weighing devices and inertial measurement units. In particular, the at least one inertial measuring unit can be arranged in such a way that accelerations and/or orientations which affect the signals of the respective weighing device are optimally detected.

According to a further development, the weighing computer may also be designed to control a pre-programmed or automatic loading of the at least one mixing container through one or more loading openings and/or a pre-programmed or automatic unloading of the at least one mixing container through one or more discharge openings, in particular depending on a recipe for the feed. In particular, the weighing computer can communicate via a wireless communication module with an appropriate control unit of the transport vehicle and/or feeders for feed components, such as silos. The pre-programmed or automatic loading or unloading or the pre-programmed or automatic unloading can be carried out, as mentioned above, by means of programs stored and updated in a storage unit of the weighing computer.

The above-mentioned objects are also solved by a weighing system, in particular for use in an agricultural transport vehicle following one of the further developments described above, with at least one load cell for detecting a weight or a weight force, the load cell comprising an integrated inertial measuring unit with a computing unit for detecting an acceleration and/or orientation of the load cell, and the inertial measuring unit being designed to compensate a raw signal of the load cell with respect to the measured acceleration and/or orientation, in particular by means of information fusion.

The same variations and further developments described above in connection with the invention of the agricultural transport vehicle can be applied to the weighing system, in particular the further developments for weighing devices, the inertial measuring unit and the computing unit described there. In particular, the load cell can be designed as a weighing bar.

Each load cell of the weighing system thus has its own integrated inertial measuring unit with associated computing unit, whereby the inertial measuring unit measures an acceleration and/or orientation or rotation rate with respect to up to 6 degrees of freedom. The raw signal output by the load cell is processed by the computing unit with respect to the measured acceleration and/or orientation, so that falsifying influences of the aforementioned oscillations, accelerations and inclinations of the load cell can be removed from the raw signal, i.e. the raw signal can be compensated. The load cell and the integrated inertial measuring unit are connected via appropriate electrical connections to signal inputs of the computing unit to which the measured values of the load cell and the integrated inertial measuring unit are entered.

The inertial measuring unit can be integrated into the load cell by designing the load cell with the inertial measuring unit as a compact component on which the inertial measuring unit is arranged at a suitable location. For example, the inertial measuring unit together with other electronics of the load cell can be arranged on a common printed circuit board. In any case, according to this development, the inertial measuring unit is integrated into the load cell by providing fixed electrical connections between the load cell and the inertial measuring unit. Furthermore, the inertial measuring unit can be mechanically fixed to the load cell. A load cell with integrated inertial measuring unit can be easily installed and used as a compact component in weighing systems and agricultural transport vehicles.

The inertial measuring unit, or more precisely its computing unit, can be designed to process the raw signal of the load cell together with the output signals of the inertial measuring unit by means of information fusion as described above. In particular, the inertial measurement unit or its computing unit may be designed to compensate the raw signal on the basis of a correlation between the raw signal and the measured acceleration and/or orientation. For this purpose, the computing unit can first determine an acceleration component in the direction of gravity from the up to 3 measured accelerations and optionally up to 3 measured orientations of the inertial measuring unit. Alternatively or in addition, the computing unit can determine an acceleration component that has a maximum influence on the measurement result of the load cell, for example by placing this component perpendicular to a measuring surface, for example a strain gauge, of the load cell. The computing unit can process the up to 6 measured signals of the inertial measuring unit in such a way that as many interference signals as possible are detected in the measured weight force of the load cell as are caused by the above-mentioned oscillations, torques, accelerations, inclinations and the like of the load cell or weighing system.

The inertial measuring unit can measure the acceleration and/or orientation in particular with respect to optimal reference values, since the acceleration due to gravity is known and is always perpendicular to the horizontal plane. The output signals of the inertial measuring unit are therefore particularly well suited for compensating the influences of other interfering forces, such as crosswind, starting or braking of the transport vehicle, tractive forces of a tractor, braking forces of wheel axles, twisting of the floor and frame, sliding forces of drive shafts, load distribution in the hold, as well as changes in the direction of travel and speed of the vehicle. Finally, the weighing system, in particular the inertial measuring unit, may have a temperature sensor that determines an ambient temperature. The measured ambient temperature can be used by the computing unit to improve the accuracy of the raw signal from the load cell by correcting for the measured temperature.

As mentioned above, the inertial measurement unit can be designed to compensate the raw signal on the basis of a correlation between the raw signal and the measured acceleration and/or orientation. In particular, the computing unit of the inertial measuring unit can calculate a correlation between the raw signal and each output signal, i.e. up to 6 degrees of freedom, of the inertial measuring unit in order to isolate an interfering signal contained in the raw signal. The raw signal can then be compensated by subtracting the isolated interference signal. Alternatively, the measured acceleration and/or orientation, i.e. the output signals of the inertial measuring unit, can be shifted and scaled with respect to the raw signal, whereby the processing of the output signals described above to determine an acceleration component can be performed first.

As mentioned above, the inertial measuring unit can be designed to measure movements in all 6 degrees of freedom. However, if properly aligned, it may be sufficient to measure the acceleration perpendicular to the driving plane and at least the angles of orientation about the longitudinal and transverse axes of the transport vehicle.

The inertial measuring unit can in particular be designed to output the compensated raw signal as a CAN data signal. For this purpose, the inertial measuring unit can have one or more CAN busses via which coded data can be output.

According to a further development, the weighing system, in particular the inertial measuring unit of one or all load cells, may have a writable storage unit for storing software for information fusion. As described above, this software can be specifically designed depending on the position of the load cell used on the agricultural transport vehicle. As described above, the weighing system and in particular the load cell with integrated inertial measuring unit can also have a wireless communication module, for example via Bluetooth or Wi-Fi, for communication with a SaaS provider in the cloud, via which the software stored in the storage unit can be updated and adapted to the respective requirements. The storage unit can be rewritable and, in particular, non-volatile, for example in the form of a flash memory.

The compensated raw signals output by the load cells with integrated inertial measuring units can be further processed by other units of the weighing system, such as a weighing computer, as described above, for example by applying a filter and addition to determine the total weight. The integration of the inertial measuring units into the respective load cells ensures that the interference caused by acceleration, oscillations and inclination is always measured locally at the relevant point. The raw signals of the load cells can thus be compensated individually and optimally, so that an overall result can be provided with high precision and without significant loss of time.

The above objects are also solved by using one of the weighing systems described above in an agricultural transport vehicle after one of the further developments described above. Similarly, the above objects are solved by a method for detecting the weight of load in at least one hold of one of the agricultural transport vehicles described above, in which a raw signal based on the measured weight force is first output by means of at least one weighing device in accordance with the further developments described above. One or more raw signals are then further processed as described in detail above, in particular by means of information fusion, with the output signals of one or more inertial measurement units, in order to compensate for interfering influences from accelerations, oscillations and inclinations of the transport vehicle. The inertial measuring units detect the acceleration and/or orientation of the respective measuring unit with up to 6 degrees of freedom and transmit the measured signals as output signals to one or more computing units, in particular integrated into the respective inertial measuring units.

The same variations and further developments described above in connection with the agricultural transport vehicle according to the invention and the weighing system according to the invention may also be applied to the method for detecting the weight of load in a hold. In particular, compensated raw signals from a plurality of computing units, in particular a plurality of inertial measuring units with integrated computing units, can be processed further in a weighing computer by using a filter, in particular a smoothing filter or a low-pass filter. The filtered signals can then be combined, in particular added, to determine the total weight of load in each hold. It is understood that, as described above, a detected weight of parts of the transport vehicle, such as the empty weight of the hold or mixing container, can be subtracted from the combined signal to determine only the weight of the load.

The described transport vehicles, weighing systems and weighing methods allow a quick and precise determination of the weight of load in a hold. In particular, delays due to lengthy filter processes can be avoided by pre-compensating the raw signals. This also accelerates the loading and unloading processes on the farm and facilitates the farmer's work.

Further features and exemplary embodiments as well as advantages of the present invention are explained in more detail below using the drawings. It goes without saying that the embodiments do not exhaust the scope of this invention. It also goes without saying that some or all of the features described below can be combined in other ways.

BRIEF DESCRIPTION OF THE DRAWINGS

FIG. 4 shows a weighing system according to the invention according to a first further development.

FIG. 5 shows a weighing system according to the invention according to a second further development.

FIG. 7 shows exemplary measurement curves of weight and vertical acceleration.

FIG. 8 shows the measurement curves of FIG. 7 after moving the measured weight.

FIG. 9 shows a temporal section of the measurement curves of FIG. 8.

FIG. 10 shows a method for detecting a weight of load according to the present invention.

DETAILED DESCRIPTION OF THE PREFERRED EMBODIMENTS

Figure 1:
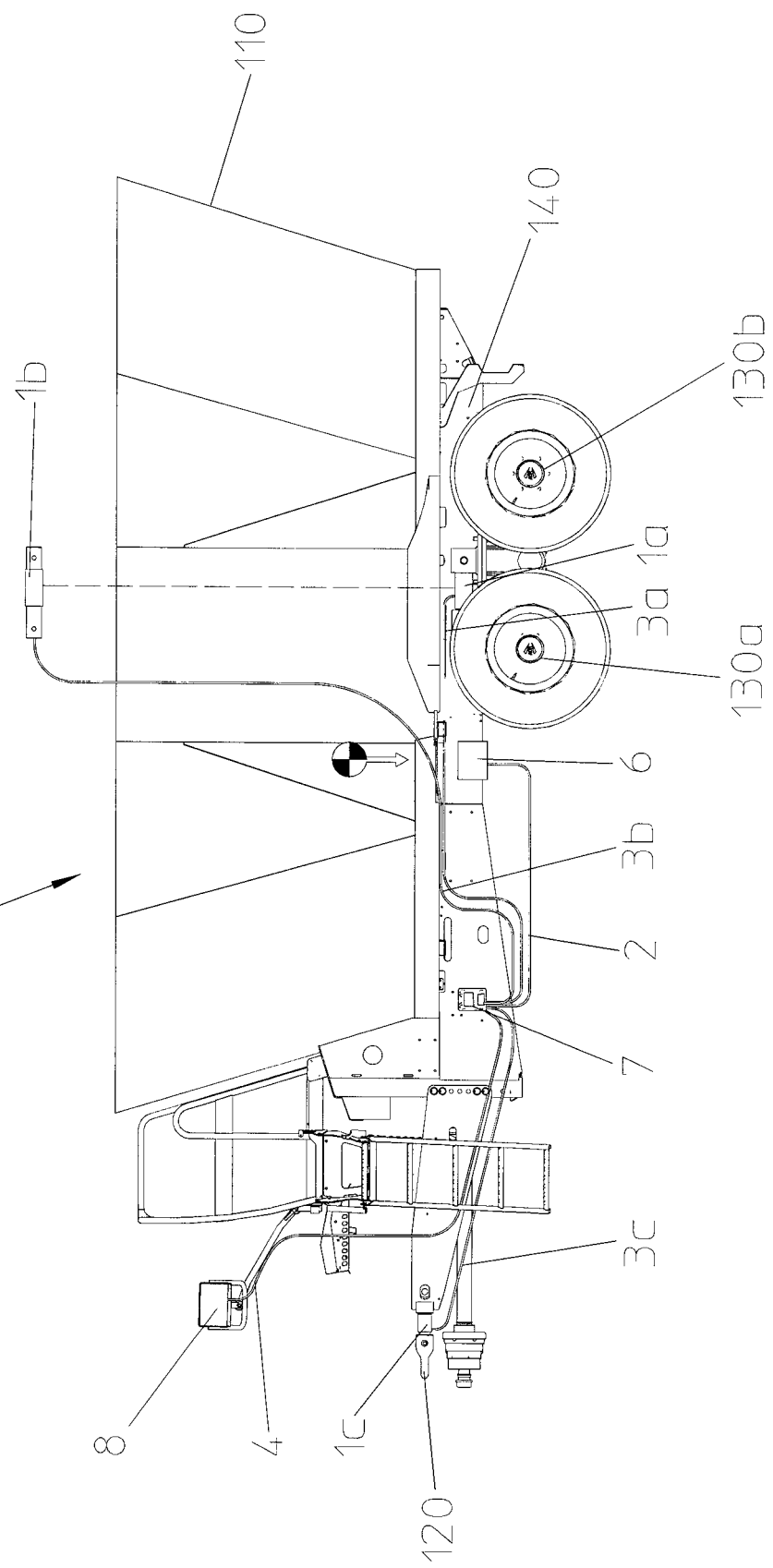
FIG. 1 shows an agricultural transport vehicle according to a first further development of the present invention.

In the Figures described below, identical reference numerals denote identical elements. For better clarity, the same elements are only described at their first occurrence. It goes without saying, however, that the variants and embodiments of an element described with reference to one of the Figures can also be applied to the corresponding elements in the other Figures.

FIG. 1 shows an agricultural transport vehicle according to a first further development of the present invention. The topology of the weighing system used for this agricultural transport vehicle corresponds to the abstract topology of FIG. 6a.

FIG. 1 shows an example of a 100 mixer-wagon pulled over a drawbar as a towing device 120 as an example of an agricultural transport vehicle. It goes without saying, however, that the present invention is not limited to the specific further development of the agricultural transport vehicle described above, but can be applied by a person skilled in the art to other agricultural transport vehicles of a known type.

In addition to the usual elements in the further development described above, the mixer-wagon 100 has a single hold 110, which is mounted on a tandem axle via a 140 chassis. It goes without saying that the hold 110 can have one or more mixing containers for the fodder. The tandem axle comprises the two wheel axles 130a and 130b, with which the chassis 140 is supported by wheels towards the ground. The fodder in hold 110 is thus supported, together with the other components of the transport vehicle 100, by the right and left sides of the tandem axle and the hitch device 120. In an advantageous way, therefore, in the further development of FIG. 1, a load cell 1a-c is provided at each of these support points, by means of which the respective proportion of the weight force in the total weight of the transport vehicle including loading is measured. Load cell 1b, which is located on the right-hand side of the transport vehicle, as seen in the direction of travel, between the tandem axle and the chassis in accordance with the arrangement of load cell 1a, is shown in FIGS. 1 to 3 above hold 110 for illustrative reasons.

Via electrical lines 3a-c, the measured weight forces are transmitted in the form of raw signals to a computing unit 7, where they are processed together with the measurement signals for measured accelerations and/or orientations output by the inertial measuring unit 6 and transmitted via the electrical line 2 as described above. In the further development presented here, only a single inertial measuring unit 6 is provided, which is arranged below the center of gravity of the transport vehicle 100 indicated by a quarter circle in FIGS. 1 to 3. The arrangement of the inertial measuring unit 6 can be selected in relation to the center of gravity of the empty transport vehicle or in relation to the center of gravity of the maximum loaded transport vehicle.

The computing unit 7 compensates the raw signals of the load cells 1a-c for the measured acceleration and/or orientation and then transmits them via an electrical line 4 to the weighing computer 8. The computing unit 7 can already carry out further processing steps on the compensated raw signals, for example by filtering, in particular smoothing, the compensated raw signals. Furthermore, the computing unit can determine a total weight by adding the filtered signals. The known empty weight of the transport vehicle can be subtracted from the determined total weight of the transport vehicle 100 including loading by means of the computing unit 7, so that the already corrected weight of the fodder is passed on to the weighing computer 8, where it can be shown on a display for the operator. Alternatively, the further processing of the compensated raw signals can be carried out by a computing unit of the weighing computer itself.

Figure 2:
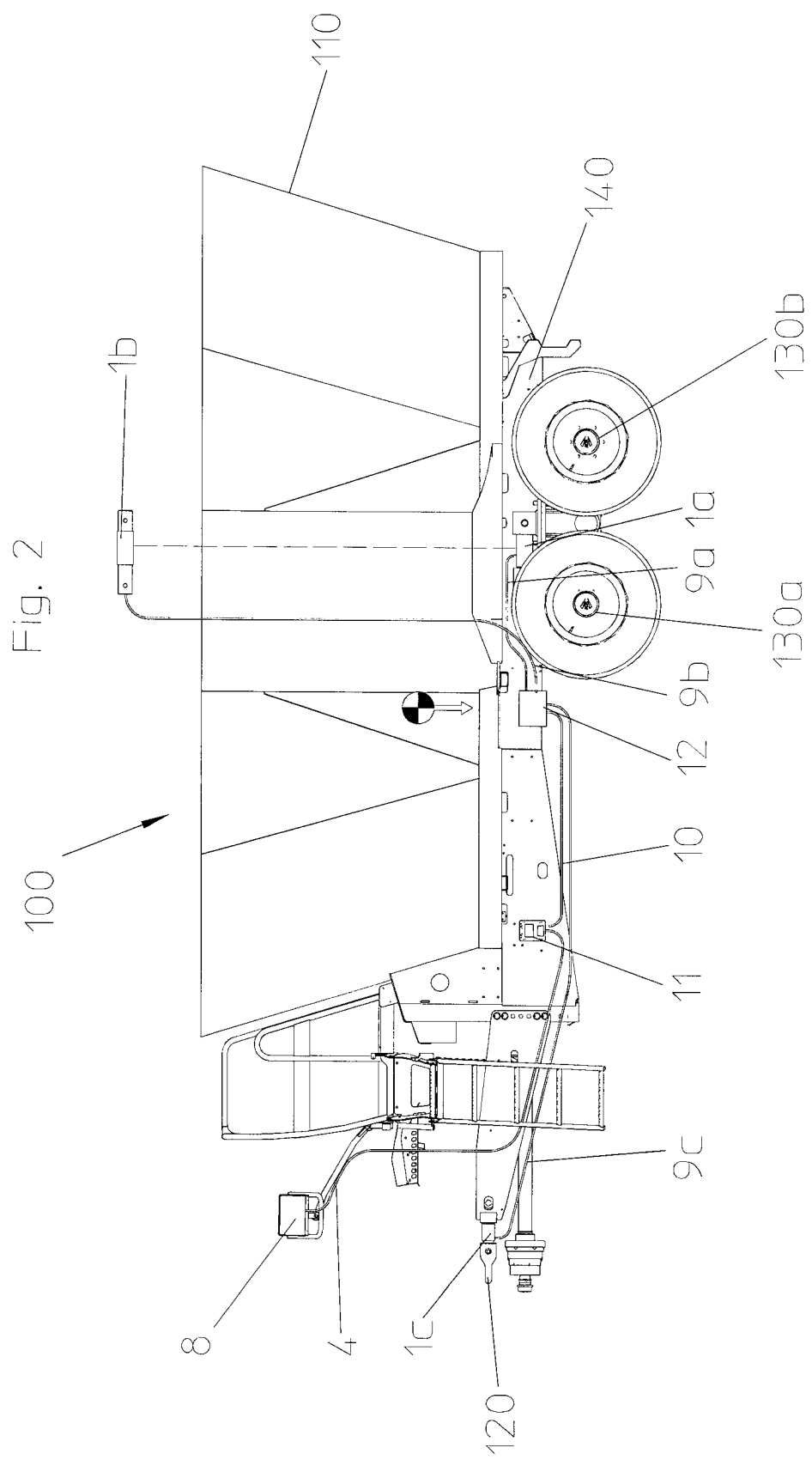
FIG. 2 shows an agricultural transport vehicle according to a second further development of the present invention.
Figure 3:
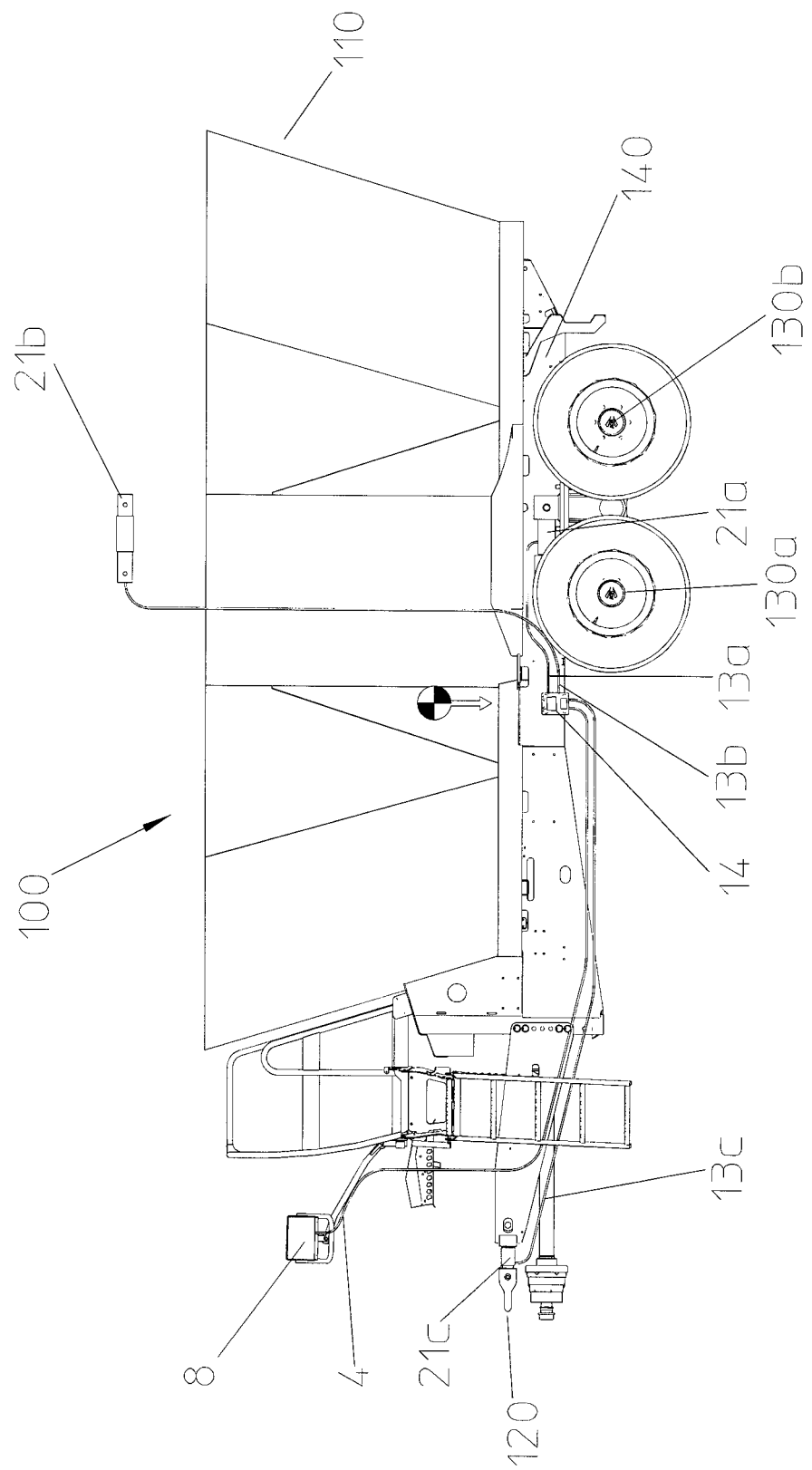
FIG. 3 shows an agricultural transport vehicle according to a third further development of the present invention.

FIG. 2 shows a variation of the agricultural transport vehicle according to a second further development of the present invention. The topology of the weighing system of this further development corresponds to the abstract topology in FIG. 6c.

Differently than with the further development of FIG. 1, the plurality of the load cells 1a-c in the further development of FIG. 2 is connected directly via electrical lines 9a-c with the inertial measuring unit 12. The above-mentioned compensation of the raw signals is thus carried out by a computing unit of the inertial measuring unit 12. Since only one inertial measuring unit 12 is provided here, this is advantageously located close to the center of gravity, especially below it. In accordance with the further development described above, the computing unit of the inertial measuring unit 12 can now process the compensated raw signals in order to calculate the total weight of the transport vehicle or the weight of the load. Alternatively, the compensated raw signals can be transmitted via the electrical line 10 to a computing unit 11, which carries out the described steps for calculating the total weight or the weight of the load. The result is transmitted from the computing unit 11 via the electrical line 4 to the weighing computer 8, which displays it on a display. The weighing computer 8 shown here can thus essentially be reduced to a display with input function.

It goes without saying that in all the further developments described here wireless data transmission is also possible through corresponding communication modules of the units used. In addition, the inertial measurement units, computing units and weighing computers can each have storage units and optional communication modules for connection to the cloud in order to store software in the storage units that is specially adapted to the respective position and function of the respective unit.

FIG. 3 shows an agricultural transport vehicle according to a third further development of the present invention. The topology of the weighing system used here corresponds to the topology of FIG. 6d with inertial measuring units integrated in the load cells.

In the further development of FIG. 3, weighing bars 21a-c on the tandem axles on the right and left sides of the vehicle as well as the hitch device 120 are provided, in each of which a separate inertial measuring unit including computing unit is integrated. The respective computing unit compensates the weight force measured by the respective weighing bar directly with the acceleration and/or orientation values of the weighing bar detected by the associated inertial measurement unit. Due to the close spatial relationship between the weighing bar and the associated inertial measuring unit, this further development can prevent possible errors that may occur due to the center of gravity of the loaded transport vehicle deviating from the arrangement of the inertial measuring unit and due to different accelerations at the respective load cells.

The already compensated raw signals are transmitted from the load cells with integrated inertial measuring units via electrical lines 13a-c to the computing unit 14, which carries out the further processing steps described above to determine the total weight or the weight of the load. The result is transmitted again via the electrical line 4 to the weighing computer 8, where it is shown on a display.

FIG. 4 shows a weighing system according to a first further development with a weighing bar with integrated inertial measuring unit. Of the weighing system schematically shown here, only the weighing computer 16 with operating unit and display and a single weighing bar 21 with integrated inertial measuring unit 22 are shown. The inertial measuring unit 22 has an integrated computing unit for compensating the raw signals of the weighing bar.

The weighing bar 21 shown here as an example has an upper strain gauge 26 and a lower strain gauge 24, which are connected to the inertial measuring unit 22, more precisely the computing unit, via electrical lines 25 and 23 respectively. Thus, the weighing bar 21, designed as a compact unit, already outputs the weight compensated by the acceleration and/or orientation of the weighing bar measured by the inertial measuring unit 22 via the electrical line 15 to the weighing computer 16.

A modification of the weighing system shown in FIG. 4 according to a second further development is shown in FIG. 5. Here, for example, 3 weighing bars 21a-c with integrated inertial measuring units 22 are connected via electrical lines 13a-c to a connection unit 14, which collects the compensated raw signals of the individual weighing bars, encodes them accordingly and forwards them via line 4 to the weighing computer 8. The latter can then carry out the further processing steps described above to determine the total weight or the weight of the load. Alternatively, the connection unit 14 can have a computing unit that performs the processing steps and transmits the final result to the weighing computer 8 via the electrical line 4.

Since each weighing bar 21a-c has its own inertial measuring unit 22, the raw signals of the strain gages 24 and 26 can be optimally compensated with the locally measured accelerations and/or orientations. In this way, the weight of the load can be determined with high precision.

FIGS. 6a-d show various topologies of weighing systems according to the invention. It goes without saying that combinations of the topologies shown are also conceivable. In addition, agricultural transport vehicles can use several weighing systems, for example separate weighing systems for each mixing container.

In the topologies shown, A denotes a load cell or a weighing bar, while B denotes an inertial measuring unit. C can represent a computing unit or a weighing computer.

Figure 6C:
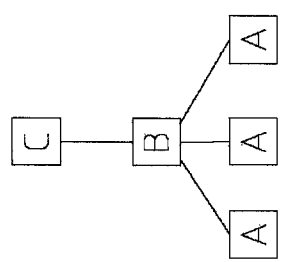
FIGS. 6*a*-*d* show various topologies of the weighing systems according to the invention.
Figure 6D:
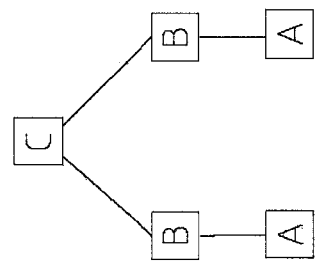
Figure 6A:
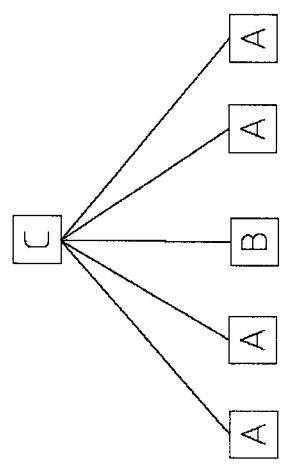

In the topology of FIG. 6a, a plurality of load cells and at least one inertial measuring unit are connected to a computing unit which processes the raw signals of the load cells together with the output signals of the at least one inertial measuring unit to determine compensated raw signals.

Figure 6B:
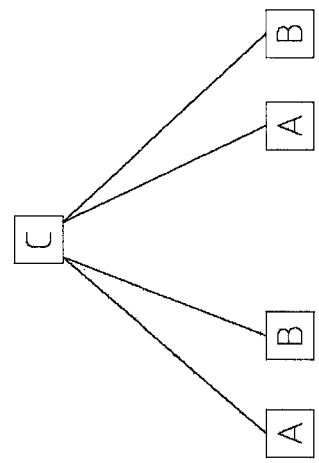

In the topology of FIG. 6b, a separate inertial measuring unit is provided for each load cell, which can be advantageously located in the immediate vicinity of the respective load cell. The raw signals of the load cells and the output signals of the inertial measuring units are processed by the computing unit C in pairs according to the respective pairing in order to calculate a large number of compensated raw signals.

In the topology of FIG. 6c, the raw signals of a large number of load cells are already compensated in the computing unit of the inertial measuring unit, which transmits the compensated raw signals or processed signals to a C weighing computer.

Finally, in the topology of FIG. 6d, each load cell A is assigned its own inertial measuring unit B with integrated computing unit, which compensates for the raw signals of the respective load cell and forwards the compensated raw signals to the weighing computer C. This means that the raw signals are transmitted to the weighing computer C. The weighing computer C is the only weighing unit that can be used to measure the raw signals of the load cell. A particularly compact design of this topology results from the integration of the inertial measuring units B into the respective load cell A as described above.

FIGS. 7 to 9 show exemplary measurement curves for a vertical acceleration measured by an inertial measuring unit and a weight measured by a weighing bar. The application of the measurement curves against time already shows a strong correlation between the oscillations of the individual measurement curves in the raw data of FIG. 7. This becomes even clearer when the weight is shifted to the baseline of the acceleration curve as shown in FIG. 8. A corresponding shift, e.g. of the measured acceleration, plus possible scaling of the fluctuations, can, for example, be carried out by the computing unit of the inertial measuring unit.

FIG. 9 shows a temporal section of the measurement curves of FIG. 8 after shifting the measurement curve of the weight, which illustrates the approximately exact correlation of the fluctuations. If the weight or acceleration is shifted back after scaling and the scaled acceleration is subtracted from the weight, a compensated weight signal can be easily generated, in which the falsifying influences of the acceleration are eliminated. In this way, a high-precision measurement signal can be obtained even without a complex filter process.

Finally, FIG. 10 shows a method for detecting a weight of load in accordance with the present invention. Parallel to each other, a weight force is measured in step 150 using a load cell or a weighing bar and output as a raw signal. In step 160, acceleration and/or orientation are measured using an inertial measuring unit and output as output signals. Up to 6 degrees of freedom can be measured and correspondingly 6 output signals can be output. The measurements in steps 150 and 160 are performed repeatedly at the corresponding measurement frequencies, whereby the measurement frequency of the inertial measurement unit greater than or equal to the measurement frequency of the load cell is advantageously selected.

In step 170, the raw signals from the load cells are compensated on the basis of the measured accelerations and/or orientations and output as compensated raw signals. The compensated raw signals are additionally filtered in step 180, in particular smoothed. Finally, the filtered signals are added in step 190, whereby a known empty weight of the transport vehicle or the hold can be subtracted. The calculated weight of the load is finally shown as the result in step 200 on a display of a weighing computer.

The weight of the load, determined with high precision and shown in the diagram, enables a farmer to precisely determine how much feed remains in a hold or how much a feed mix weighs after a certain feed component has been loaded. In this way, a loading operation of a mixing container can be carried out precisely and pre-programmed or automatically. Similarly, the distribution of fodder to different groups of livestock can take place with high precision and without time delays. This not only facilitates the farmer's work, but also improves the breeding and production results.

What is claimed is:

1. An agricultural transport vehicle comprising:
   at least one hold for agricultural bulk goods;
   at least one weighing device, said at least one weighing device detecting the weight of a load in said at least one hold;
   at least one inertial measuring unit, said at least one inertial measuring unit measuring an acceleration and/or orientation of either the agricultural transport vehicle or said at least one hold, wherein at least one of said at least one inertial measuring unit is provided in the region of a center of gravity of the agricultural transport vehicle, and wherein said at least one inertial measuring unit is less than 50 cm away from at least one of a center of gravity of an empty transport vehicle and a center of gravity of a maximum loaded transport vehicle; and
   at least one computing unit adapted to compensate a raw signal of the weighing device with respect to the measured acceleration and/or orientation.

2. An agricultural transport vehicle according to claim 1, wherein:
said at least one computing unit is integrated into a respective said at least one inertial measuring unit.

3. An agricultural transport vehicle according to claim 2, wherein:
said at least one inertial measuring unit is integrated into a respective at least one weighing device, and wherein said at least one computing unit of the respective said at least one inertial measuring unit is designed so as to be configurable in order to compensate the raw signal of the weighing device depending on a position of the weighing device on the agricultural transport vehicle.

4. An agricultural transport vehicle according to claim 1, wherein:
each of said at least one weighing device is associated with a separate one of said at least one inertial measuring unit adapted to compensate for the raw signal of said weighing device.

5. An agricultural transport vehicle according to claim 1, further comprising:
a weighing computer adapted to process compensated raw signals of the at least one weighing device into a total weight of a load in said at least one hold.

6. An agricultural transport vehicle according to claim 5, wherein:
said weighing computer being adapted to apply a filter to the compensated raw signals.

7. An agricultural transport vehicle according to claim 6, wherein:
the filter comprises a smoothing filter.

8. An agricultural transport vehicle according to claim 6, wherein:
the filter comprises a low-pass filter.

9. An agricultural transport vehicle according to claim 5, wherein:
said weighing computer comprises a wireless communication module for wireless communication with a Software-as-a-Service (SaaS) provider and/or a mobile telecommunications terminal.

10. An agricultural transport vehicle according to claim 1, wherein:
said at least one inertial measuring unit or the integrated computing unit, having a writable storage unit for storing software.

11. An agricultural transport vehicle according to claim 1 further comprising:
at least one mixing container as hold for fodder as load, wherein the agricultural transport vehicle is a mixer-wagon.

12. An agricultural transport vehicle according to claim 11, wherein:
a weighing computer is further designed to control a pre-programmed or automatic loading of said at least one mixing container through one or more loading openings and/or a pre-programmed or automatic unloading of said at least one mixing container through one or more discharge openings.

13. An agricultural transport vehicle comprising:
at least one hold for agricultural bulk goods;
at least one weighing device, said at least one weighing device detecting the weight of a load in said at least one hold;
at least one inertial measuring unit, said at least one inertial measuring unit measuring an acceleration and/or orientation of either the agricultural transport vehicle or said at least one hold, wherein at least one of said at least one inertial measuring unit is provided in the region of a center of gravity of the agricultural transport vehicle;
at least one computing unit adapted to compensate a raw signal of the weighing device with respect to the measured acceleration and/or orientation;
wherein said at least one inertial measuring unit or said at least one computing unit having a writable storage unit for storing software; and
wherein at least one of said at least one inertial measuring unit is provided on an axle of the agricultural transport vehicle and/or on a hitch device.

14. An agricultural transport vehicle for transporting a load comprising:
a hold placed on the agricultural transport vehicle, said hold adapted to receive a load;
a weighing device coupled to said hold, said weighing device capable of detecting a weight of the load and generating a raw signal representative of the weight;
an inertial measuring unit, said inertial measuring unit capable of measuring acceleration or orientation of said hold, said inertial measuring unit capable of generating a signal representative of an acceleration or orientation of said hold, said inertial measuring unit arranged in a region of a center of gravity of the agricultural transport vehicle;
a computing unit, said computing unit receiving the raw signal representative of the weight from said weighing device and the signal representative of an acceleration or orientation of said hold from said inertial measuring unit; and
wherein said computing unit calculates a falsifying influence due to the acceleration or orientation of said hold on the raw signal representative of the weight and compensates for the falsifying influence and calculates an actual total weight of the load,
whereby the actual total weight of the load is determined without the falsifying influence due to the acceleration or orientation of said hold providing loading and unloading of the load with high-precision.

15. An agricultural transport vehicle for transporting a load according to claim 14 wherein:
said inertial measuring unit is less than 50 cm away from at least one of a center of gravity of an empty transport vehicle and a center of gravity of a maximum loaded transport vehicle.

* * * * *